(12) United States Patent
Kringstad

(10) Patent No.: US 12,290,838 B2
(45) Date of Patent: *May 6, 2025

(54) PILER CONVEYOR SYSTEM

(71) Applicant: Kringstad Ironworks, Inc., Park River, ND (US)

(72) Inventor: Burnell R. Kringstad, Park River, ND (US)

(73) Assignee: Kringstad Ironworks, Inc., Park River, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,218

(22) Filed: Feb. 2, 2024

(65) Prior Publication Data

US 2024/0173747 A1 May 30, 2024

Related U.S. Application Data

(63) Continuation of application No. 17/895,772, filed on Aug. 25, 2022, now Pat. No. 11,890,645, which is a
(Continued)

(51) Int. Cl.
*B65G 65/28* (2006.01)
*B07B 1/10* (2006.01)
(Continued)

(52) U.S. Cl.
CPC ............... *B07B 1/10* (2013.01); *B07B 13/16* (2013.01); *B65G 65/28* (2013.01); *B65G 65/32* (2013.01); *A01D 25/00* (2013.01); *A01D 90/02* (2013.01); *B65G 47/18* (2013.01); *B65G 47/72* (2013.01); *B65G 2201/047* (2013.01)

(58) Field of Classification Search
CPC .. B07B 1/10; B07B 1/12; B07B 13/16; B65G 65/28; B65G 65/32; B65G 2201/047; A01D 25/00; A01D 90/02
See application file for complete search history.

(56) References Cited

U.S. PATENT DOCUMENTS

| | | |
|---|---|---|
| 984,740 A | 2/1911 | Beall |
| 1,415,191 A | 5/1922 | Parks |
| | (Continued) | |

OTHER PUBLICATIONS https://www.schmidt-agrarhandel.com/images/pdf_dokumente/jabelmann/sortieranlagen/bandsortierer_krukowiak_m_649.pdf; Schmidt Agrarhandel Gmbh Website—Euro-Jabelmann EURO-Sorter M-649 Brochure PDF; Before Nov. 21, 2017.
(Continued)

*Primary Examiner* — Joseph C Rodriguez
(74) *Attorney, Agent, or Firm* — Neustel Law Offices

(57) ABSTRACT

A piler conveyor system for screening debris such as tare dirt from materials such as beets as the materials are conveyed across a piler. The piler conveyor system generally includes a frame supporting an upper conveyor and a pair of lower conveyors. The upper conveyor is adapted to receive materials such as beets. As the materials are conveyed by the upper conveyor, debris such as tare dirt or the like will fall through screening openings in the upper conveyor and onto the lower conveyor. The lower conveyor may then dispense the debris through a debris opening. The materials will drop off the end of the upper conveyor and fall onto the second lower conveyor, which will convey the screened materials to be dispensed.

20 Claims, 11 Drawing Sheets

Related U.S. Application Data continuation of application No. 16/739,247, filed on Jan. 10, 2020, now Pat. No. 11,426,765, which is a continuation of application No. 15/819,445, filed on Nov. 21, 2017, now Pat. No. 10,537,918.

(51) Int. Cl.
  B07B 13/16 (2006.01)
  B65G 65/32 (2006.01)
  *A01D 25/00* (2006.01)
  *A01D 90/02* (2006.01)
  *B65G 47/18* (2006.01)
  *B65G 47/72* (2006.01)

(56) References Cited

U.S. PATENT DOCUMENTS

| | | | |
|---|---|---|---|
| 1,438,673 A | 12/1922 | Trescott | |
| 1,609,442 A | 12/1926 | Thompson | |
| 2,997,086 A | 8/1961 | Armer | |
| 3,348,680 A | 10/1967 | Mathews | |
| 3,429,438 A | 2/1969 | Palmen | |
| 3,593,719 A | 7/1971 | Ashton | |
| 3,628,609 A | 12/1971 | Graybill | |
| 3,854,585 A | 12/1974 | Herkes | |
| 4,856,263 A * | 8/1989 | Schneider | B65G 65/00 414/794.9 |
| 4,861,461 A | 8/1989 | Utterback | |
| 5,183,160 A | 2/1993 | McClain | |
| 5,234,564 A | 8/1993 | Smith | |
| 5,261,171 A | 11/1993 | Bishop | |
| 5,860,533 A | 1/1999 | Wood | |
| 6,298,644 B1 | 10/2001 | Sandei | |
| 6,460,706 B1 | 10/2002 | Davis | |
| 6,843,376 B2 | 1/2005 | Dube | |
| 6,877,610 B2 | 4/2005 | Boast | |
| 7,921,628 B2 * | 4/2011 | Meester | A01D 45/006 171/27 |
| 9,078,397 B2 | 7/2015 | Farley | |
| 9,452,448 B2 | 9/2016 | Dettmer | |
| 10,537,918 B2 | 1/2020 | Kringstad | |
| 11,033,933 B2 | 6/2021 | Rafferty | |
| 11,426,765 B2 | 8/2022 | Kringstad | |
| 11,511,319 B2 | 11/2022 | Mcdevitt | |
| 2004/0211092 A1 | 10/2004 | Barnes | |
| 2010/0012556 A1 | 1/2010 | Pohle | |
| 2010/0031621 A1 | 2/2010 | Meester | |
| 2021/0032041 A1 | 2/2021 | Geywitz | |

OTHER PUBLICATIONS https://www.harriston-mayo.com/mayo/equipment/web-belt-sizer-stainless-steel/; Mayo Manufacturing Web Belt Sizer Stainless Steel Webpage; Before Nov. 21, 2017.

https://www.vandorensales.com/potato-inspection-grading-equipment; Van Doren Potato Inspection & Grading Equipment Webpage; Before Nov. 21, 2017.

* cited by examiner

PILER CONVEYOR SYSTEM

CROSS REFERENCE TO RELATED APPLICATIONS

The present application is a continuation of U.S. application Ser. No. 17/895,772 filed on Aug. 25, 2022, which is a continuation of U.S. Application Ser. No. 16/739,247 filed on Jan. 10, 2020 now issued as U.S. Pat. No. 11,426,765, which is a continuation of U.S. application Ser. No. 15/819, 445 filed on Nov. 21, 2017 now issued as U.S. Pat. No. 10,537,918. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a piler conveyor system for screening debris such as tare dirt from materials such as beets as the materials are conveyed across a piler.

Related Art

Any discussion of the related art throughout the specification should in no way be considered as an admission that such related art is widely known or forms part of common general knowledge in the field.

Pilers are utilized across a wide range of industries for piling materials on a ground surface or transferring materials to a receiver container or vehicle. Pilers are commonly used within the agricultural industry in harvesting crops. For example, in beet harvesting, the beets may be conveyed across a piler to be dispensed into a vehicle, storage container, or a pile on a ground surface. Pilers may also be utilized in industries for storing materials, such as conveying grain to be stored in a silo.

In the past, solid belts have been utilized on conveying systems in conventional pilers. These solid belts do not screen any debris from the materials, so the materials are invariably dispensed with debris such as tare dirt or the like covering the materials. This can be particularly problematic with underground crops which are often harvested with a large amount of debris hanging on to the materials. The solid belts typically used in conveying systems on pilers are also often narrow and can cause jams or damage to the harvested materials.

SUMMARY

An example embodiment is directed to a piler conveyor system. The piler conveyor system includes a frame supporting an upper conveyor and a pair of lower conveyors. The upper conveyor is adapted to receive materials such as beets. As the materials are conveyed by the upper conveyor, debris such as tare dirt or the like will fall through screening openings in the upper conveyor and onto the lower conveyor. The lower conveyor may then dispense the debris through a debris opening. The materials will drop off the end of the upper conveyor and fall onto the second lower conveyor, which will convey the screened materials to be dispensed.

There has thus been outlined, rather broadly, some of the embodiments of the piler conveyor system in order that the detailed description thereof may be better understood, and in order that the present contribution to the art may be better appreciated. There are additional embodiments of the piler conveyor system that will be described hereinafter and that will form the subject matter of the claims appended hereto. In this respect, before explaining at least one embodiment of the piler conveyor system in detail, it is to be understood that the piler conveyor system is not limited in its application to the details of construction or to the arrangements of the components set forth in the following description or illustrated in the drawings. The piler conveyor system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
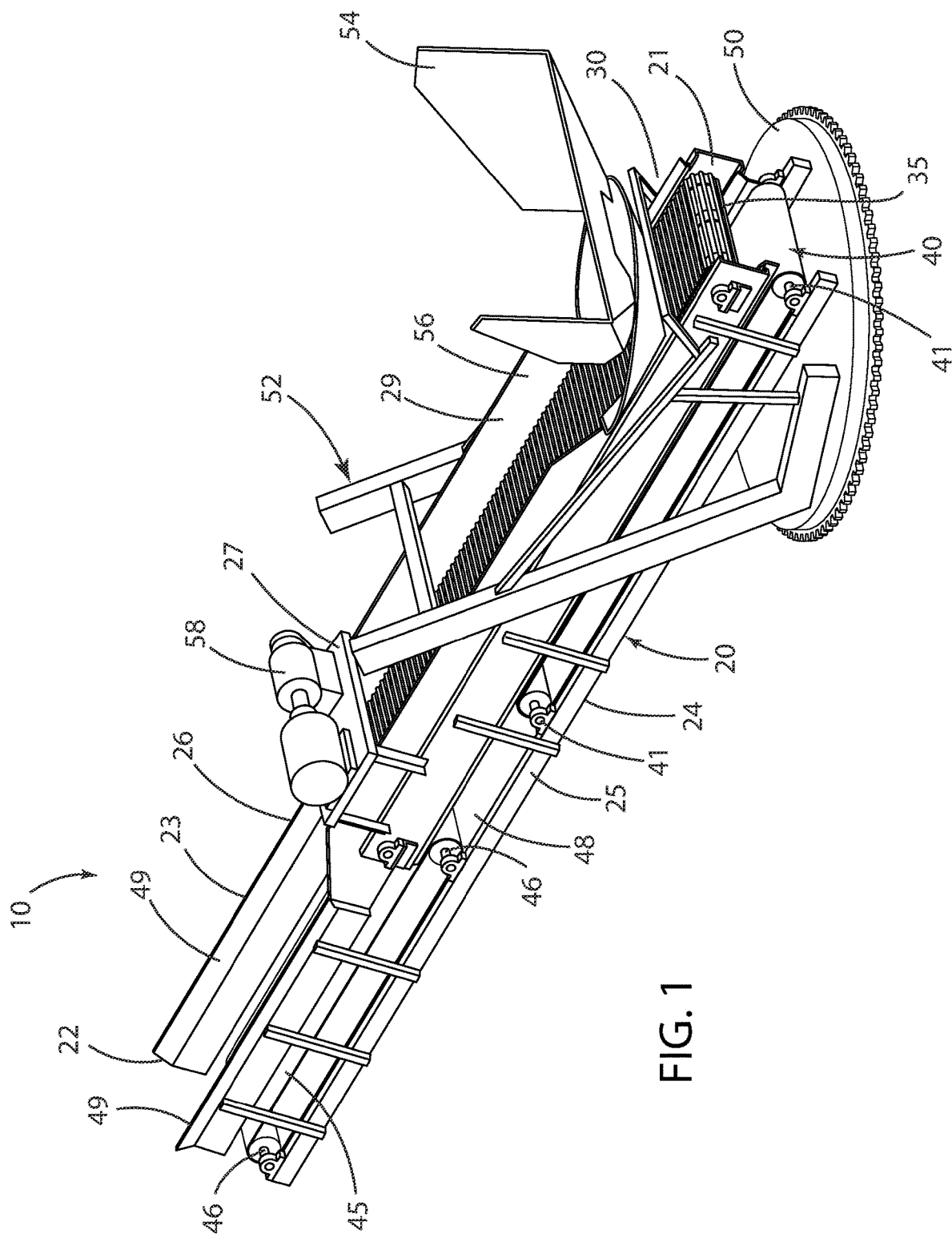
FIG. 1 is a perspective view of a piler conveyor system in accordance with an example embodiment.

An example piler conveyor system 10 generally comprises a frame including an inlet end 21, an outlet end 22, an upper end 23, and a lower end 24. The system 10 may include an upper conveyor 30 comprising a first end and a second end, wherein the first end of the upper conveyor 30 is movably connected near the inlet end 21 of the frame 20. The upper conveyor 30 is adapted to receive a plurality of materials 12 such as beets to be conveyed. The upper conveyor 30 may comprise a plurality of screening openings 35 through which debris 14 such as tare dirt and fines from the materials 12 may fall onto one or more lower conveyors 40, 45. The upper conveyor 30 may be connected to the upper end 23 of the frame 20.

The lower conveyors 40, 45 may comprise a solid structure such as a belt or the like which is movably connected to the frame 20 beneath the upper conveyor 30. The lower conveyors 40, 45 may comprise a first lower conveyor 40, a second lower conveyor 45, and a debris opening 48 between the first lower conveyor 40 and the second lower conveyor 45 through which the debris 14 may fall to the ground surface below the frame 20. The lower conveyors 40, 45 may be connected to the lower end 23 of the frame 20. The second lower conveyor 45 may include a pair of lower sidewalls 49 on either end of the second lower conveyor 45 for guiding the materials 12 as the materials 12 are conveyed by the second lower conveyor 45.

The upper conveyor 30 may be positioned over the first lower conveyor 40 such that the debris 14 from the materials 12 may fall through the screening openings 35 and onto the first lower conveyor 40; with the first lower conveyor 40 being adapted to convey the debris 14 to be dispensed at a first location through the debris opening 35.

The second end of the upper conveyor may be positioned over the second lower conveyor 45 such that the materials 12 may fall from the second end of the upper conveyor 30 onto the second lower conveyor 45 to be dispensed at a second location. The upper conveyor 30 may comprise a first side belt 32, a second side belt 33, and a plurality of rods 34 connected in parallel between the first and second side belts 32, 33. In such an embodiment, the screening openings 35 are positioned between the rods 34 of the upper conveyor 30.

In some embodiments, a single lower conveyor 40, 45 may be utilized which comprises a first section 40 and a second section 45; with a debris opening 48 such as a gap between the first and second sections 40, 45. In such a manner, a single conveyor structure may be utilized; with the first section 40 being adapted to dispense the debris underneath the frame 20, such as near the inlet end 21 of the frame 20.

The frame 20 may be rotatable about one or more axes in some embodiments. For example, the frame 20 may be rotatable about both an X-axis and a Y-axis with respect to a ground surface. The system 10 may include an inlet receiver 54 connected above the first end 38 of the upper conveyor 30; with the inlet receiver 54 being adapted to receive and transfer the materials 12 to the upper conveyor 30. A pair of guide wings 56 connected to the inlet receiver 54 may guide the materials 12 from the inlet receiver 54 onto the upper conveyor 30. The frame 20 may also include an upper platform 27 connected to the upper end 23 of the frame 20 over the upper conveyor 30 to support a motor 60 for driving the conveyors 30, 40, 45. In some embodiments, two or more motors 60, 64 may be utilized to drive the conveyors 30, 40, 45; such as by utilizing a first motor 60 for driving the upper conveyor 30 and a secondary motor 64 for driving the first and second lower conveyors 40, 45.

Also disclosed herein is a method of conveying materials 12 in a piler system, including transferring the materials 12 onto an upper conveyor 30 comprised of a plurality of screening openings 35, conveying the materials 12 with the upper conveyor 30 such that a debris 14 from the materials 12 may fall through the screening openings 35, and transferring the debris 14 through the screening openings 35 onto a first lower conveyor 40 positioned underneath the upper conveyor 30. Such an exemplary method also includes conveying the debris 14 to a debris opening 48 by the first lower conveyor 40 and dispensing the debris 14 at a first location through the debris opening 48 by the first lower conveyor 40. In such an exemplary method, the materials 12 may be transferred from the upper conveyor 30 to a second lower conveyor 45 which is positioned underneath the upper conveyor 30 and then conveying the materials 12 to be dispensed at a second location by the second lower conveyor 45.

B. Frame

As shown throughout the figures, an exemplary embodiment may include a frame 20 which supports both the upper conveyor 30 and the lower conveyors 40, 45. The frame 20 will generally extend from an inlet point to receive the materials 12 to an outlet point to dispense the materials 12. The frame 20 will generally be elongated and may be of varying length depending on the embodiment so as to be suited for different applications. The frame 20 may comprise a boom or arm which is adapted to extend outwardly from a base 50 or vehicle. The frame 20 may be adjustably connected to the base 50 or vehicle such that the frame 20 may rotate about one or more axes, such as by being raised or lowered. In some embodiments, the length of the frame 20 may be adjustable by selectively collapsing or expanding the frame 20.

Figure 4:
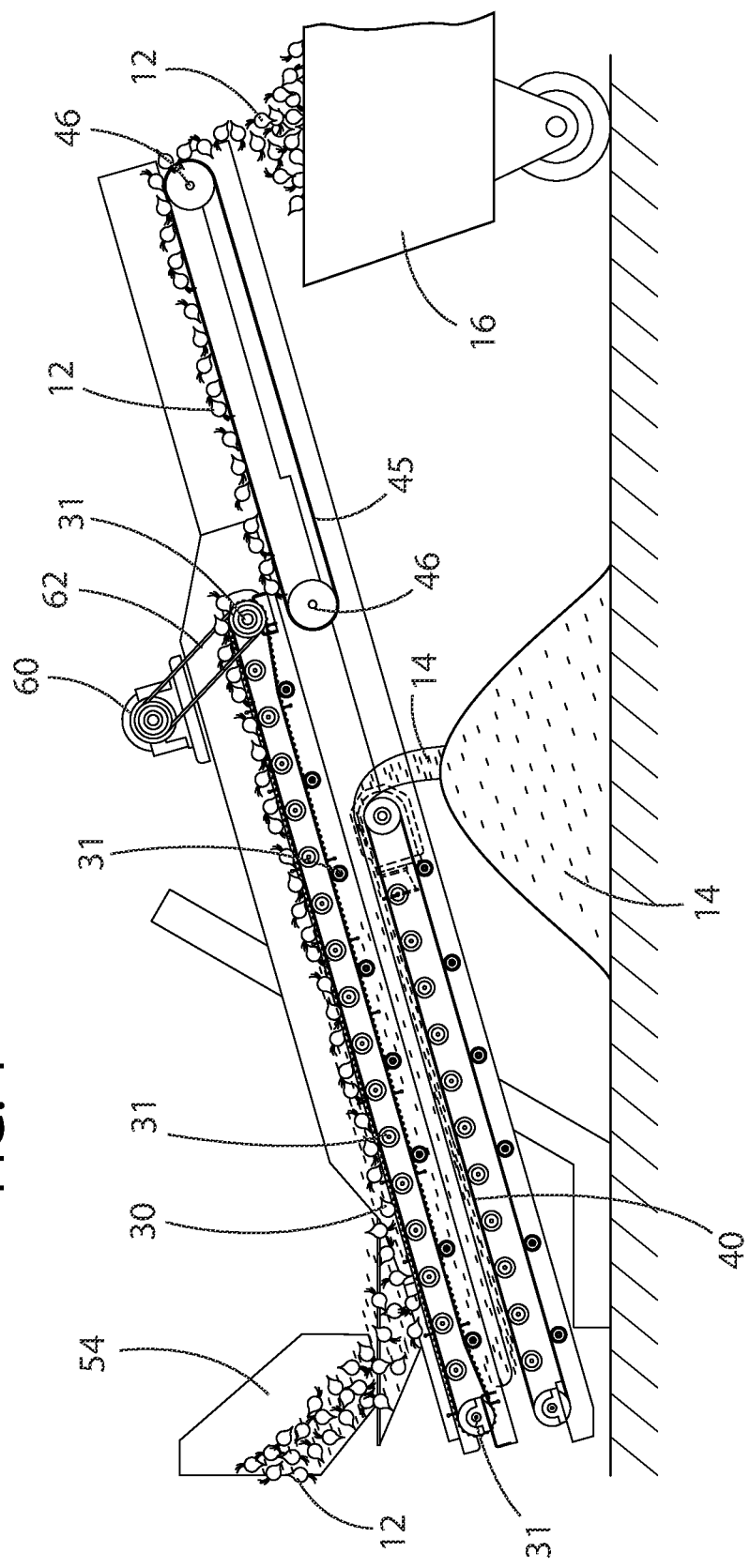
FIG. 4 is a view of a piler conveyor system in use in accordance with an example embodiment.
Figure 9:
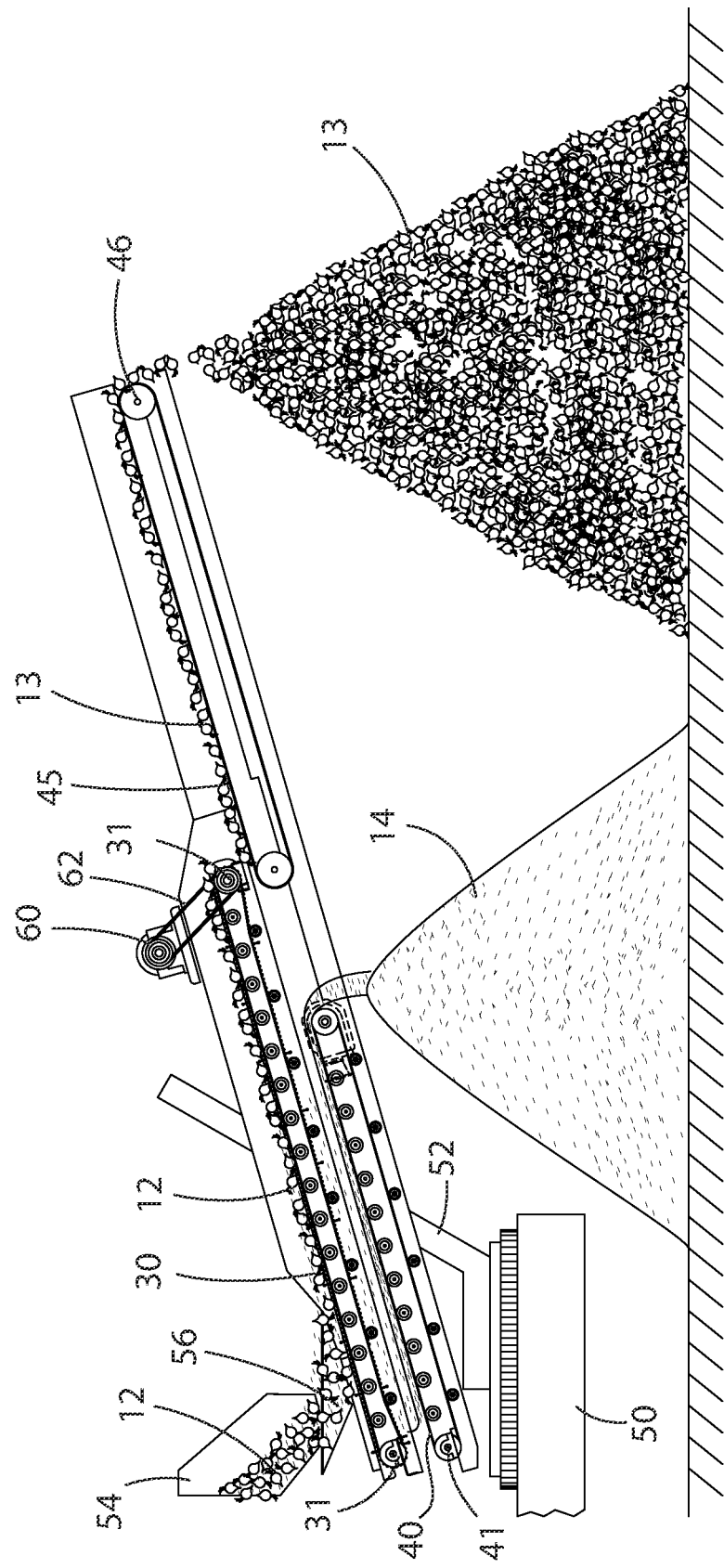
FIG. 9 is a side view of a piler conveyor system in use in accordance with an example embodiment.
Figure 10:
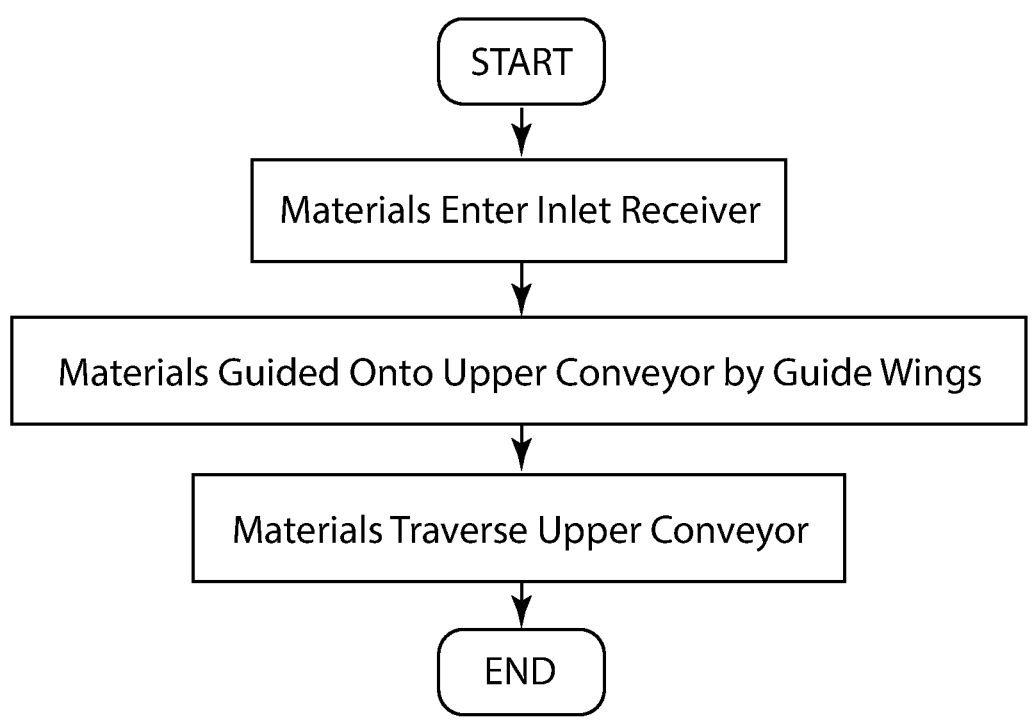
FIG. 10 is a flow chart illustrating materials being transferred onto the upper conveyor in accordance with an example embodiment.

As shown in FIG. 1, an exemplary embodiment of a frame 20 may comprise an inlet end 21, an outlet end 22, an upper end 23, and a lower end 24. The inlet end 21 of the frame 20 is positioned to receive the materials 12, including any debris 14 among or attached to the materials 12. The outlet end 22 of the frame 20 is positioned over the desired dispensing point for the materials 12 after the debris 14 has been screened therefrom. A receiver container 16 may be positioned underneath the outlet end 22 of the frame 20 such as shown in FIG. 4, or a pile of the materials 12 may be formed on the ground surface such as shown in FIG. 9.

The upper end 23 of the frame 20 may comprise an upper tier of the frame 20 to which the upper conveyor 30 is connected. The lower end 24 of the frame 20 may comprise a lower tier of the frame 20 to which the lower conveyors 40, 45 are connected. The frame 20 may include a first side support 25 and a second side support 26 between which the conveyors 30, 40, 45 are connected. As shown in FIG. 1, vertical beams or other types of supports may extend between the upper end 23 and the lower end 24 of the frame 20 for structural integrity purposes.

The frame 20 may include various connection points for one or more motors 60, 64 adapted to drive the conveyors 30, 40, 45. It should be appreciated that the number of motors 60, 64 utilized, as well as the positioning of such motors 60, 64, may vary in different embodiments. In some embodiments, a primary motor 60 will drive the upper conveyor 30 and a secondary motor 64 will drive the lower conveyors 40, 45.

Figure 3:
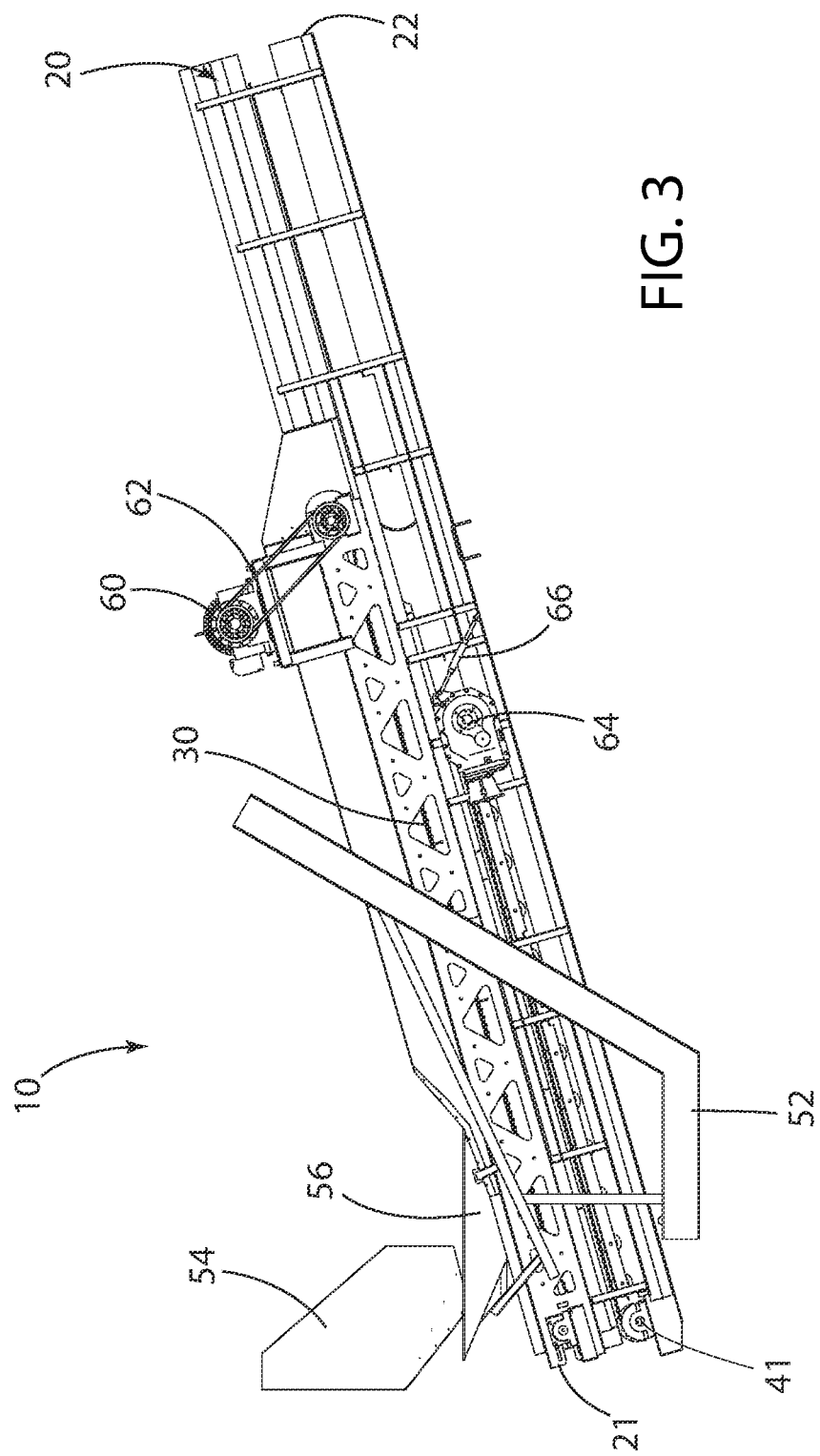
FIG. 3 is a side view of a piler conveyor system in accordance with an example embodiment.

In the exemplary embodiment shown in FIG. 3, the frame 20 includes an upper platform 27 which is connected to the upper end 23 of the frame 20 above the upper conveyor 30. A motor 60 is illustrated as being positioned on the upper platform 27; with a linkage 62 such as a drive belt connected between the motor 60 and the upper rollers 31 of the upper conveyor 30 to drive the upper conveyor 30. In FIG. 3, an illustrative secondary motor 64 is illustrated which is connected to the lower end 24 of the frame 20 to drive the lower conveyors 40, 45. An actuator 66 is also shown that may be connected between the secondary motor 64 and the frame 20.

The frame 20 will generally function as a boom that may be rotated or otherwise adjusted to control the location at which the screened materials 13 are dispensed. The frame 20 may be connected to a base 50 such as shown in FIG. 1. In such an embodiment, a support frame 52 is connected between the base 50 and the frame 20. The base 50 may be rotatable about one or more axes, such as about an X-axis and a Y-axis with respect to the ground surface. In some embodiments, the base 50 or the frame 20 itself may be connected to a vehicle so that the frame 20 may be easily repositioned.

Figure 2:
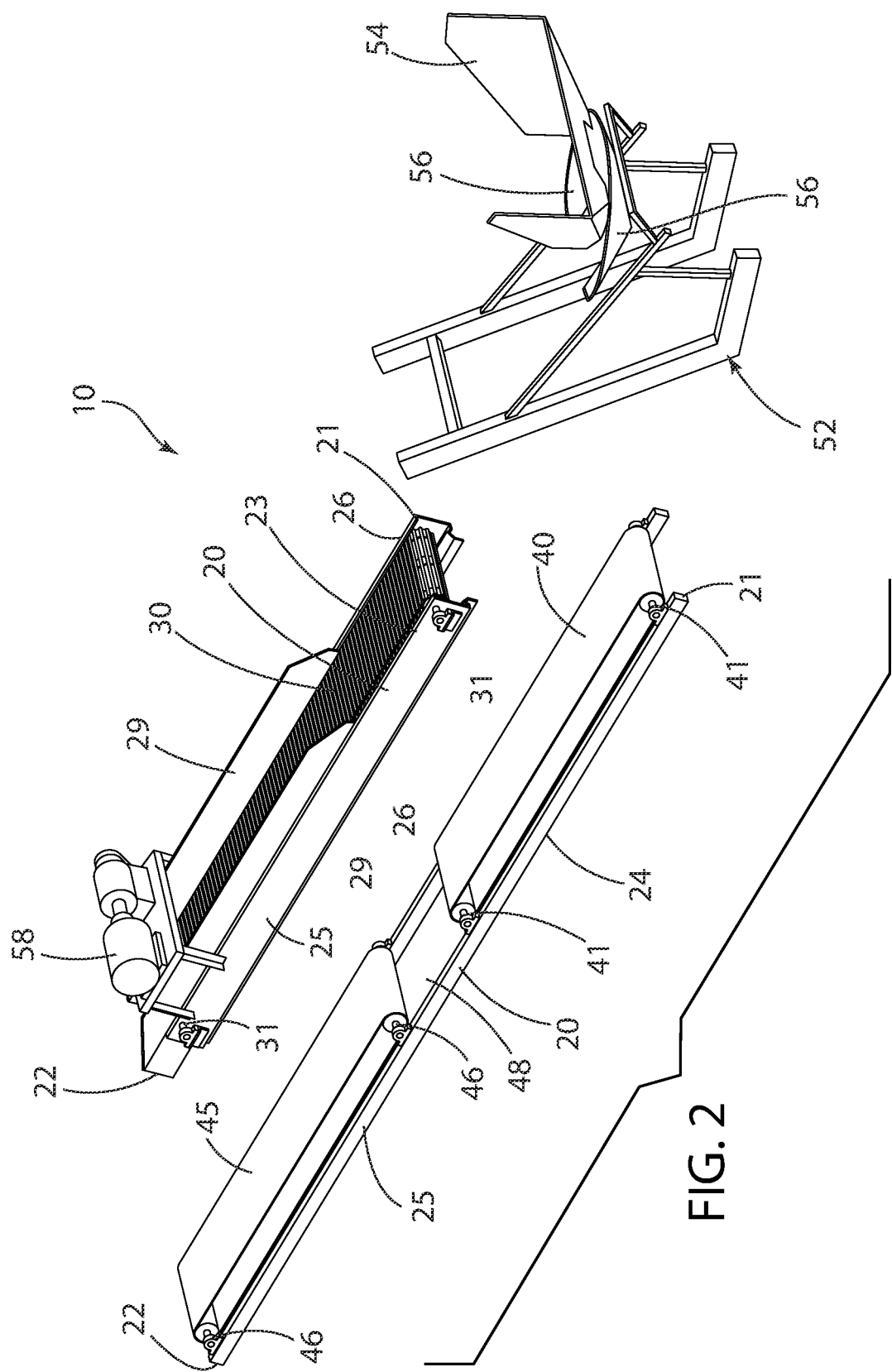
FIG. 2 is an exploded perspective view of a piler conveyor system in accordance with an example embodiment.

As best shown in FIGS. 1-2, the frame 20 may include an inlet receiver 54 which is adapted to receive the materials 12 to be screened and dispensed. The inlet receiver 54 is generally connected near the inlet end 21 of the frame 20. In the exemplary embodiments shown in the figures, the inlet receiver 54 is connected to the upper end 23 of the frame 20 above its inlet end 21. The inlet receiver 54 may comprise a chute, hopper, or other structure which will cause the materials 12 to be transferred onto the upper conveyor 30.

Figure 6:
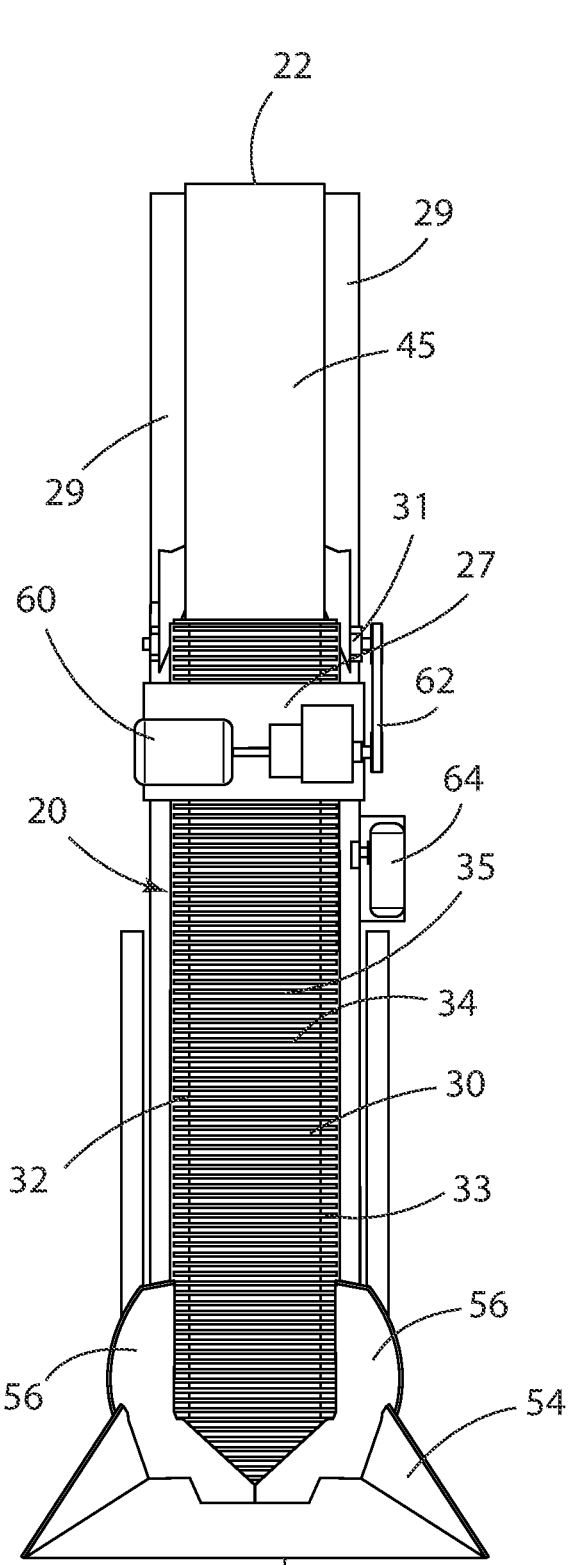
FIG. 6 is a top view of a piler conveyor system in accordance with an example embodiment.
Figure 7:
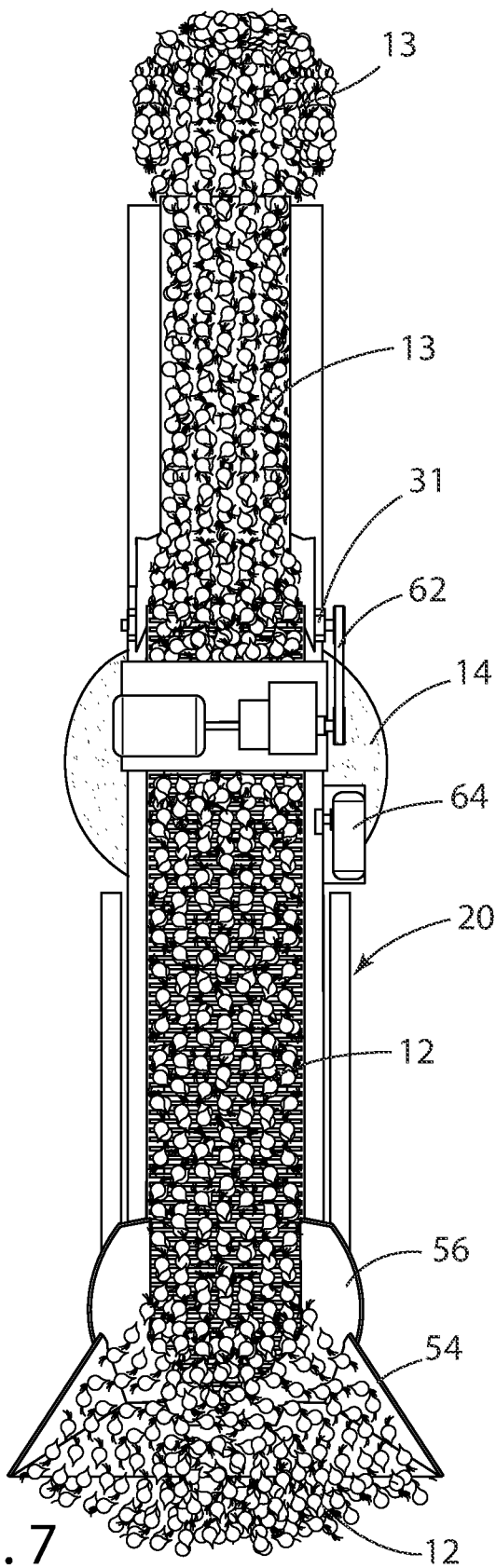
FIG. 7 is a top view of a piler conveyor system in use in accordance with an example embodiment.
Figure 8:
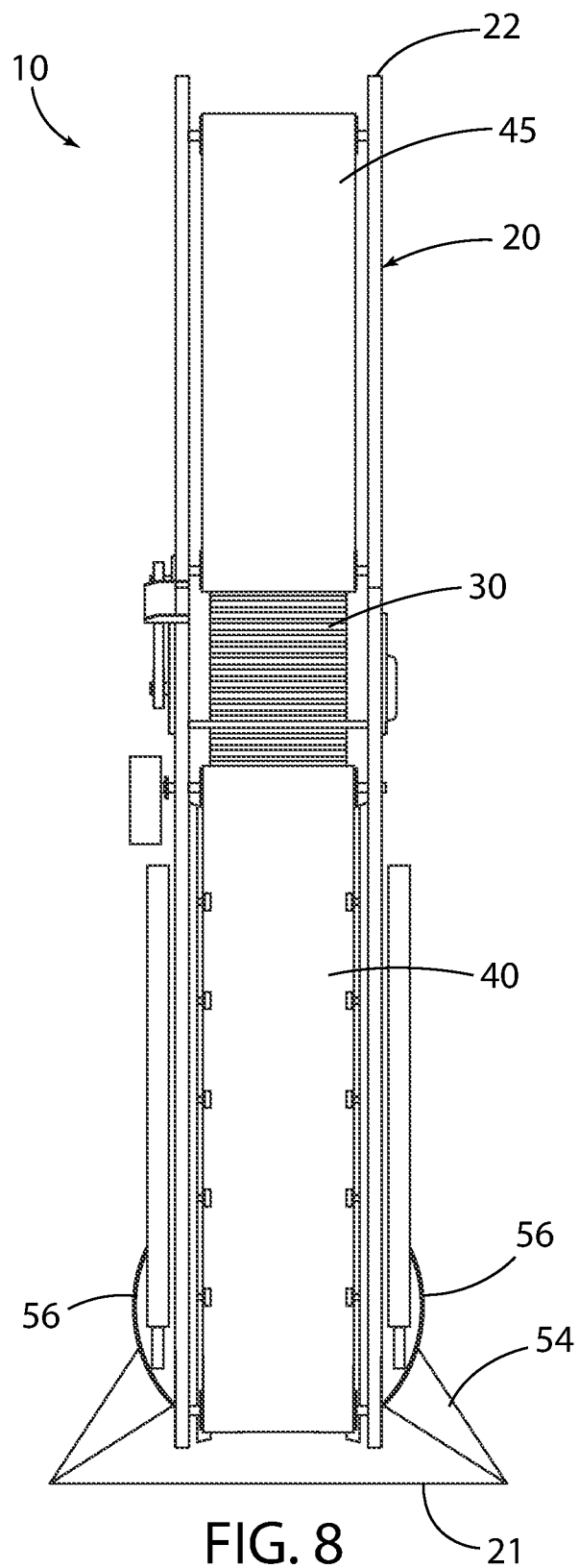
FIG. 8 is a bottom view of a piler conveyor system in accordance with an example embodiment.

As shown in FIGS. 6 and 7, a pair of guide wings 56 may be connected to the frame 20 between the inlet receiver 54 and the upper conveyor 30. The guide wings 56 may be flexible and resilient such that the guide wings 56 will expand outwardly to accommodate a large amount of materials 12 being fed therein. The guide wings 56 also serve as a metering device to control the speed and volume of materials 12 entering the upper conveyor 30. The guide wings 56 will cause the materials 12 to be centrally positioned and evenly distributed on the upper conveyor 30.

C. Upper Conveyor

As shown throughout the figures, an upper conveyor 30 is adapted to receive and convey the materials 12. As the materials 12 are conveyed across the upper conveyor 30, debris 14 from the materials 12 will be screened so as to fall onto the first lower conveyor 40 to be dispensed at a first location. The screened materials 13 will reach the second end 39 of the upper conveyor 30 and fall onto the second lower conveyor 45 to be dispensed at a second location. Thus, the first end 38 of the upper conveyor 30 will generally be positioned over the first lower conveyor 40 and the second end 39 of the upper conveyor 30 will generally be positioned over the second lower conveyor 45.

The upper conveyor 30 is generally connected to the upper end 23 of the frame 20 such as shown in FIG. 1. It should be appreciated that the shape, length, and width of the upper conveyor 30 may vary between different embodiments to suit different purposes. The upper conveyor 30 will generally not extend for the entire length of the frame 20. In the figures, the upper conveyor is illustrated as extending from the inlet end 21 of the frame 20 to an approximate mid-point on the frame 20.

It should be appreciated that the ratio between the length of the upper conveyor 30 and the length of the frame 20 may vary in different embodiments. The positioning or length of the upper conveyor 30 with respect to the frame 20 may vary in different embodiments to suit different workspaces or applications.

As shown in FIG. 1, the first end 38 of the upper conveyor 30 is generally connected near the inlet end 21 of the frame 20 such that materials 12 entering the frame 20 via its inlet end 21 will be transferred onto the upper conveyor 30. The second end 39 of the upper conveyor 38 is positioned over the second lower conveyor 45 such that screened materials 13 may fall off the second end 39 of the upper conveyor 38 onto the second lower conveyor 45 to be conveyed to the outlet end 22 of the frame 20 to be dispensed such as shown in FIG. 4.

The upper conveyor 30 may include upper rollers 31 around which the upper conveyor 30 is driven. The upper rollers 31 may comprise idle and driven rollers. The driven rollers will be connected to the motor 60 so as to drive the upper conveyor 30. Any idle rollers will roll when driven by the motion of the driven rollers. Other configurations known in the art for moving a conveyor may be utilized and thus the configuration shown in the figures and described herein should not be construed as limiting in scope.

Figure 5:
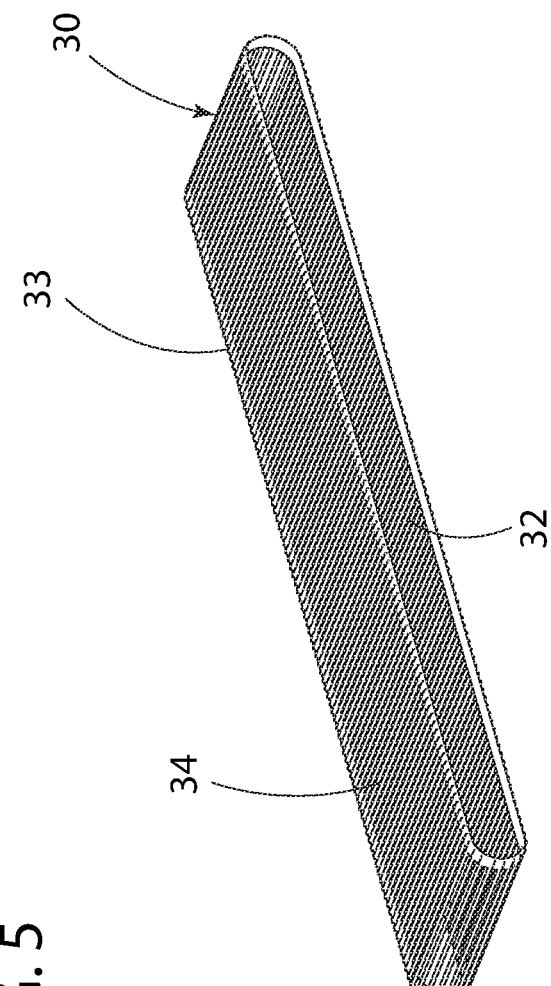
FIG. 5 is an upper perspective view of an exemplary upper conveyor in accordance with an example embodiment.

The upper conveyor 30 may comprise various configurations. FIG. 5 illustrates one such exemplary configuration of the upper conveyor 30. The upper conveyor 30 is illustrated as comprising a first side belt 32, a second side belt 33, and a plurality of rods 34 connected in parallel between the side belts 32, 33. The rods 34 may be rotatably connected to the side belts 32, 33 such that the rods 34 may rotate as the upper conveyor is in motion. Such rotation may aid in driving debris 14 through the screening openings 35. In other embodiments, the rods 34 may be fixed so that they do not rotate with respect to the side belts 32, 33. If needed, a shaker may be utilized to shake the upper conveyor 30 to further aid with breaking debris 14 off of the materials 12 to be screened.

The rods 34 are spaced-apart with respect to adjacent rods 34 so as to define a plurality of screening openings 35 along the length of the upper conveyor 30. The size and number of screening openings 35 may vary in different embodiments and to suit different types of materials 12 and/or debris 14. The screening openings 35 will preferably be of sufficient size to allow the debris 14 to fall through while retaining the materials 12 themselves on the upper conveyor 30 for its entire length.

The upper conveyor 30 may include sidewalls 29 on either side of the upper conveyor 30 for retaining the materials 12 on the upper conveyor 30 as they traverse its length. As best shown in FIG. 1, a pair of sidewalls 29 may extend upwardly from the upper end 23 of the frame 20 on either side of the upper conveyor 30. In some embodiments, the sidewalls 29 may instead extend upwardly from the upper conveyor 30 itself (for example, the upper conveyor 30 could have built-in flanges). The sidewalls 29 may extend for the entire length of the upper conveyor 30, or may extend for only part of its length. In some embodiments, sidewalls 29 may be omitted.

D. Lower Conveyors

As shown throughout the figures, a pair of lower conveyors 40, 45 may be connected to the frame 20. Although the figures and descriptions herein discuss a first lower conveyor 40 and a second lower conveyor 45 which comprises discrete structures, it should be appreciated that a singular conveyor having a first section 40 and a second section 45 may be utilized in some embodiments. The lower conveyors 40, 45 may be integral or discrete structures and may or may not be connected to each other.

In the exemplary embodiment shown in FIGS. 2, the frame 20 includes a first lower conveyor 40, a second lower conveyor 45, and a debris opening 48 between the first and second lower conveyors 40, 45. The first lower conveyor 40 is adapted to receive the debris 14 from the materials 12 via the screening openings 35 of the upper conveyor 30 and convey the debris 14 to be dispensed at a first location through the debris opening 48. The second lower conveyor 45 is adapted to receive the screened materials 13 from the upper conveyor 30 and convey the screened materials 13 to be dispensed at a second location, such as by falling off the outlet end 22 of the frame 20 as shown in FIG. 4.

As best shown in FIG. 1, the first lower conveyor 40 may be connected to the inlet end 21 of the frame 20. The first lower conveyor 40 may be connected at various locations on the frame 20, including to the lower end 24 of the frame 20 as shown in the figures. The first lower conveyor 40 will generally extend from the inlet end 21 of the frame 20 such that materials 12 entering the inlet end 21 of the frame 20 may be screened of debris 14, but may be positioned at other locations.

As shown in FIG. 4, the first lower conveyor 40 is generally positioned underneath the upper conveyor 30. The first lower conveyor 40 will generally comprise a shorter length than the upper conveyor 30 such as shown in the figures. The first lower conveyor 40 may comprise various configurations, including a solid belt configuration as shown in the figures. The length and width of the first lower conveyor 40 may vary in different embodiments.

The first lower conveyor 40 may include a plurality of first lower rollers 41 about which the first lower conveyor 40 moves. The first lower rollers 41 may comprise a combination of driven and idle rollers. A secondary motor 64 may be provided to drive the first lower conveyor 40, or the first lower conveyor 40 may share a motor 60 with the upper conveyor 30.

The second lower conveyor 45 is best shown in FIG. 2. The second lower conveyor 45 is positioned in spaced-apart relationship with respect to the first lower conveyor 40 so as to define the debris opening 48 between the lower conveyors 40, 45 through which the debris 14 will fall onto the ground surface or a receiver container 16. The distance between the lower conveyors 40, 45, and thus the size of the debris opening 48, may vary in different embodiments.

As shown in FIG. 4, the second lower conveyor 45 is generally partially positioned underneath the upper conveyor 30. The second lower conveyor 45 will generally comprise a longer length than the upper conveyor 30 such as shown in the figures. The second lower conveyor 45 may comprise various configurations, including a solid belt configuration as shown in the figures. The length and width of the second lower conveyor may vary in different embodiments.

The second lower conveyor 45 may include a plurality of second lower rollers 46 about which the second lower conveyor 45 moves. The second lower rollers 46 may comprise a combination of driven and idle rollers. A secondary motor 64 may be provided to drive the second lower conveyor 45, or the second lower conveyor 45 may share a motor 60 with the upper conveyor 30.

The second lower conveyor 45 is preferably positioned such that screened materials 13 falling off the second end 39 of the upper conveyor 30 will naturally fall onto the second lower conveyor 45. The figures illustrate gravity being used to transfer the screened materials 13. In some embodiments, chutes, hoppers, or other structures could be utilized to aid in guiding the screened materials 13 from the upper conveyor 30 onto the second lower conveyor 45.

As shown in FIG. 1, the second lower conveyor 45 may comprise lower sidewalls 49 which extend upwardly from either side of the second lower conveyor 45. The lower sidewalls 49 may be slanted so as to naturally guide the screened materials 13 onto the second lower conveyor 45. The lower sidewalls 49 may also aid in collecting the screened materials 13 toward the center of the second lower conveyor 45.

The second lower conveyor 45 is adapted to convey the screened materials 13 to be dispensed at a second location. FIG. 4 illustrates screened materials 13 being dispensed from the second lower conveyor 45 into a receiver container 16. FIG. 9 illustrates screened materials 13 being dispensed from the second lower conveyor 45 onto a ground surface in a pile. The length of the second lower conveyor 45 may vary in different embodiments to suit different applications.

E. Operation of Preferred Embodiment

In use, the materials 12 are first transferred into the inlet receiver 54 of the frame 20. The source of the materials 12 may vary in different embodiments and should not be construed as limited in any manner. The materials 12 could be fed into the inlet receiver 54 by a chute, hopper, conduit, conveyor, or even another piler. The materials 12 could be hand-fed or machine-fed in different embodiments. As discussed herein, the materials 12 are not limited to any particular type of material, and may include crops such as beets.

The materials 12 will enter the upper conveyor 30 via the inlet receiver 54. The guide wings 56 will both guide the materials 12 onto the upper conveyor 30 and meter the amount of materials 12 being fed onto the upper conveyor 30 to prevent jams or overflow. The guide wings 56 may be angled toward each other as shown in the figures. The guide wings 56 may adjust inwardly or outwardly as the volume of materials 12 being fed via the inlet receiver 54 is decreased or increased.

The materials 12 will collect on the upper conveyor 30 continuously as the inlet receiver 54 is fed with materials 12. The upper conveyor 30 will screen the materials 12 of debris 14 as the materials 12 are conveyed from the first end 38 to the second end 39 of the upper conveyor 30 to be dispensed as screened materials 13 onto the second lower conveyor 45.

Figure 11:
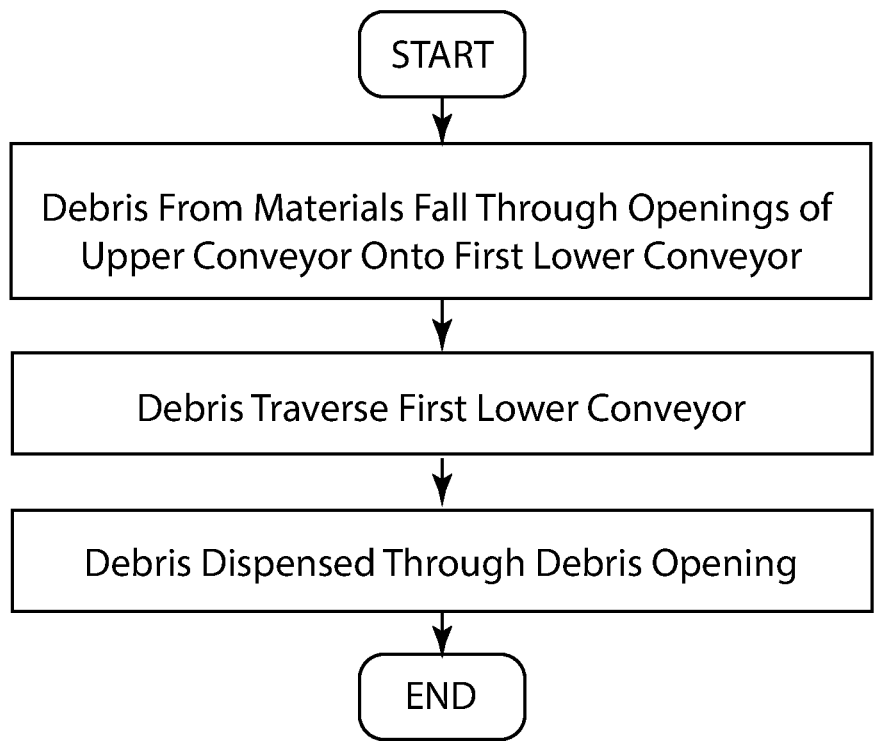
FIG. 11 is a flow chart illustrating materials being screened of debris in accordance with an example embodiment.

As the materials 12 traverse the upper conveyor 30, debris 14 from the materials 12 will fall through the screening openings 35 and onto the first lower conveyor 45 as illustrated in FIG. 11. The types of debris 14 may vary in different embodiments, and may include reclaim, tare dirt, trimmings, plant material, or the like.

Once the debris 14 reaches the first lower conveyor 40, the first lower conveyor 40 will convey the debris 14 to be dispensed through the debris opening 48 between the first and second lower conveyors 40, 45. Thus, the first lower conveyor 40 will be driven toward the second lower conveyor 45. The debris 14 will reach the end of the first lower conveyor 40 and then fall through the debris opening 48 to be collected on the ground surface or in a receiver container 16. The debris 14 may then be collected and transported for further uses or for disposal.

The materials 12 will become screened materials 13 as the debris 14 is screened by the upper conveyor 30. When the materials 12 reach the second end 39 of the upper conveyor 30, they will have been screened of debris 14 and fall as screened materials 13 from the second end 39 of the upper conveyor 30 and onto the second lower conveyor 45.

The manner in which the screened materials 13 are transferred from the upper conveyor 30 onto the second lower conveyor 45 may vary in different embodiments.

Chutes, hoppers, conduits, ramps, or the like may be utilized in some embodiments. In the embodiment shown in the figures, the screened materials 13 are allowed to free-fall onto the second lower conveyor 45.

Figure 12:
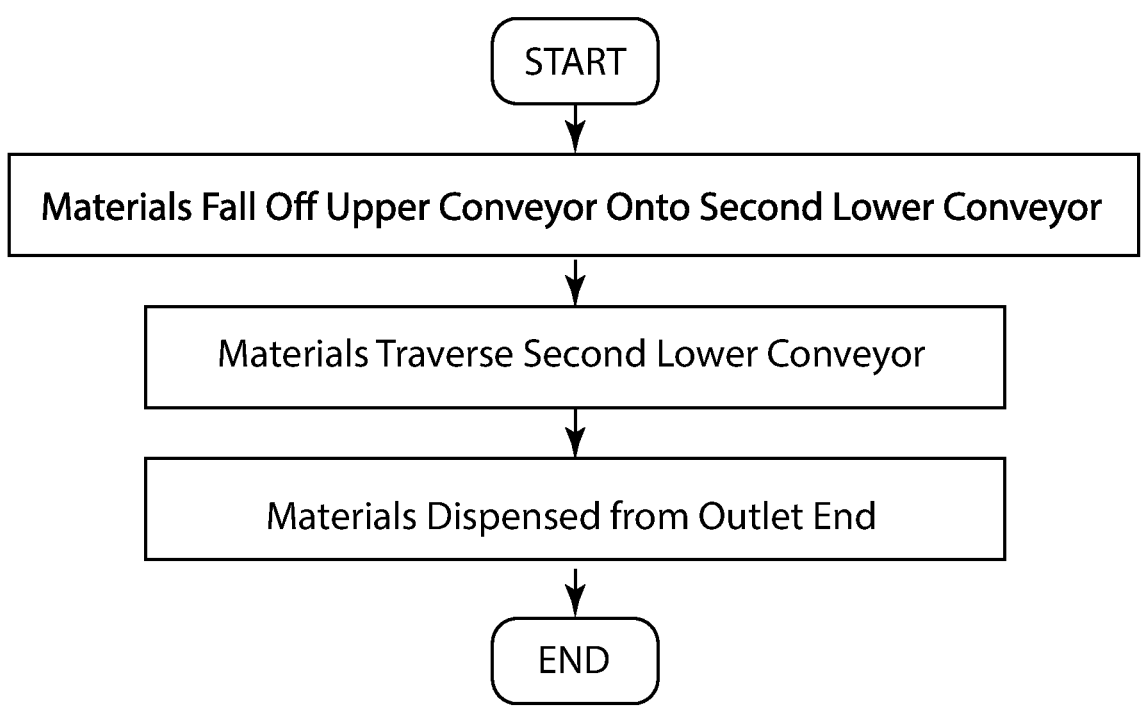
FIG. 12 is a flow chart illustrating materials being conveyed and dispensed in accordance with an example embodiment.

Once the screened materials 13 are on the second lower conveyor 45, they will be conveyed by the second lower conveyor 45 to be dispensed from the outlet end 22 of the frame 20 as illustrated in FIG. 12. FIG. 4 illustrates the screened materials 13 being dispensed into a receiver container 16. FIG. 9 illustrates the screened materials 13 being dispensed into a pile on a ground surface. In either scenario, the screened materials 13 may then be collected and transported for further use.

Unless otherwise defined, all technical and scientific terms used herein have the same meaning as commonly understood by one of ordinary skill in the art to which this invention belongs. Although methods and materials similar to or equivalent to those described herein can be used in the practice or testing of the piler conveyor system, suitable methods and materials are described above. All publications, patent applications, patents, and other references mentioned herein are incorporated by reference in their entirety to the extent allowed by applicable law and regulations. The piler conveyor system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A piler conveyor system having a distal end, comprising:
   an upper conveyor, wherein the upper conveyor conveys a material toward the distal end, wherein the upper conveyor includes a plurality of screening openings through which a debris from the material falls;
   a first lower conveyor connected to the upper conveyor, wherein the first lower conveyor is positioned below the upper conveyor, wherein the first lower conveyor receives the debris and conveys the debris toward the distal end; and
   a second lower conveyor that is co-linear with the first lower conveyor and that is spaced apart from the first lower conveyer to define an opening between the second lower conveyor and the first lower conveyor;
   wherein the debris on the first lower conveyor exits the first lower conveyor at the opening;
   wherein the second lower conveyor receives the material from the upper conveyor and conveys the material towards the distal end.

2. The piler conveyor system of claim 1, wherein the upper conveyor, the first lower conveyor, and the second lower conveyor are rotatable together about one or both of a horizontal axis and a vertical axis.

3. The piler conveyor system of claim 1, wherein the upper conveyor is connected to the first lower conveyor by a frame.

4. The piler conveyor system of claim 1, further comprising an inlet receiver positioned a proximal end of the upper conveyor, wherein the inlet receiver receives and transfers the material to the upper conveyor.

5. The piler conveyor system of claim 1, further comprising a first motor for driving the upper conveyor and a second motor for driving the first lower conveyor.

6. The piler conveyor system of claim 1, wherein the upper conveyor and the first lower conveyor are both angled upwardly.

7. The piler conveyor system of claim 6, wherein the upper conveyor is parallel to the first lower conveyor.

8. The piler conveyor system of claim 1, wherein the upper surface of the first lower conveyor is comprised of a solid structure.

9. The piler conveyor system of claim 8, wherein the solid structure comprises a belt.

10. The piler conveyor system of claim 1, wherein the first lower conveyor is shorter in length than the upper conveyor.

11. A method of using the piler conveyor system of claim 1, comprising the steps of:
    transferring the material onto the upper conveyor;
    conveying the material with the upper conveyor such that the debris from the material falls through the plurality of screening openings;
    transferring the debris through the plurality of screening openings onto the first lower conveyor;
    conveying the debris upwardly in a first direction by the first lower conveyor;
    dispensing the debris into a pile underneath a distal end of the first lower conveyor at a first location by the first lower conveyor; and
    conveying the material upwardly in the first direction to be dispensed at a second location onto the second lower conveyor.

12. A piler conveyor system, comprising:
    an upper conveyor having an inlet end and an outlet end;
    wherein the upper conveyor conveys a material upwardly to be dispensed from the outlet end of the upper conveyor, wherein the upper conveyor comprises a plurality of openings, wherein a debris from the material transported by the upper conveyor falls through the plurality of openings;
    a first lower conveyor connected to the upper conveyor, wherein the first lower conveyor is positioned below the upper conveyor such that the debris falls onto the lower conveyor, wherein the first lower conveyor includes an inlet end and an outlet end;
    wherein the upper conveyor and the first lower conveyor are parallel to one another;
    wherein the first lower conveyor conveys the debris upwardly to be dispensed from the outlet end of the first lower conveyor;
    a second lower conveyor having an inlet end and an outlet end, wherein the second lower conveyor is co-linear with the first lower conveyor and is spaced apart from the first lower conveyor to define an opening between the second lower conveyor and the first lower conveyor and wherein the debris exits the outlet end of the first lower conveyor at the opening;
    wherein the second lower conveyor receives the material from the outlet end of the upper conveyor and conveys the material toward the outlet end of the second lower conveyor; and
    a motor that drives the upper conveyor and one or both of the first lower conveyor and the second lower conveyor.

13. The piler conveyor system of claim 12, wherein the upper conveyor, the first lower conveyor, and the second lower conveyor are rotatable together about one or both of a horizontal axis and a vertical axis.

14. The piler conveyor system of claim 12, wherein the upper conveyor is connected to the first lower conveyor by a frame.

15. The piler conveyor system of claim 12, further comprising an inlet receiver positioned above the inlet end of the upper conveyor, wherein the inlet receiver receives and transfers the material to the upper conveyor.

16. The piler conveyor system of claim 12, wherein an upper surface of the first lower conveyor is comprised of a solid structure.

17. The piler conveyor system of claim 16, wherein the solid structure comprises a belt.

18. The piler conveyor system of claim 12, wherein the first lower conveyor is shorter in length than the upper conveyor.

19. A method of using the piler conveyor system of claim 12, comprising the steps of:
- transferring the material onto the upper conveyor;
- conveying the material with the upper conveyor such that the debris from the material falls through the plurality of openings;
- transferring the debris through the plurality of openings onto the first lower conveyor;
- conveying the debris upwardly in a first direction by the lower conveyor;
- dispensing the debris at the opening into a pile underneath the outlet end of the first lower conveyor at a first location by the lower conveyor; and
- conveying the material upwardly in the first direction to be dispensed onto the second lower conveyor.

20. A piler conveyor system having a distal end, comprising:
- an upper conveyor, wherein the upper conveyor conveys a material toward the distal end, wherein the upper conveyor includes a plurality of screening openings through which a debris from the material falls;
- a first lower conveyor, wherein the first lower conveyor is positioned below the upper conveyor, wherein the first lower conveyor receives the debris and conveys the debris toward the distal end, and wherein the first lower conveyor is parallel to the upper conveyor; and
- a second lower conveyor that is co-linear with the first lower conveyor and that is parallel with the upper conveyor, wherein the second lower conveyor is spaced apart from the first lower conveyer to define an opening between the second lower conveyor and the first lower conveyor;
- wherein the debris on the first lower conveyor exits the first lower conveyor at the opening; and
- wherein the second lower conveyor receives the material from the upper conveyor and conveys the material towards the distal end.

\* \* \* \* \*